July 21, 1942.  L. MARGOLIS  2,290,696
AUTOMATIC FRICTION CLUTCH
Filed March 24, 1941  2 Sheets-Sheet 1
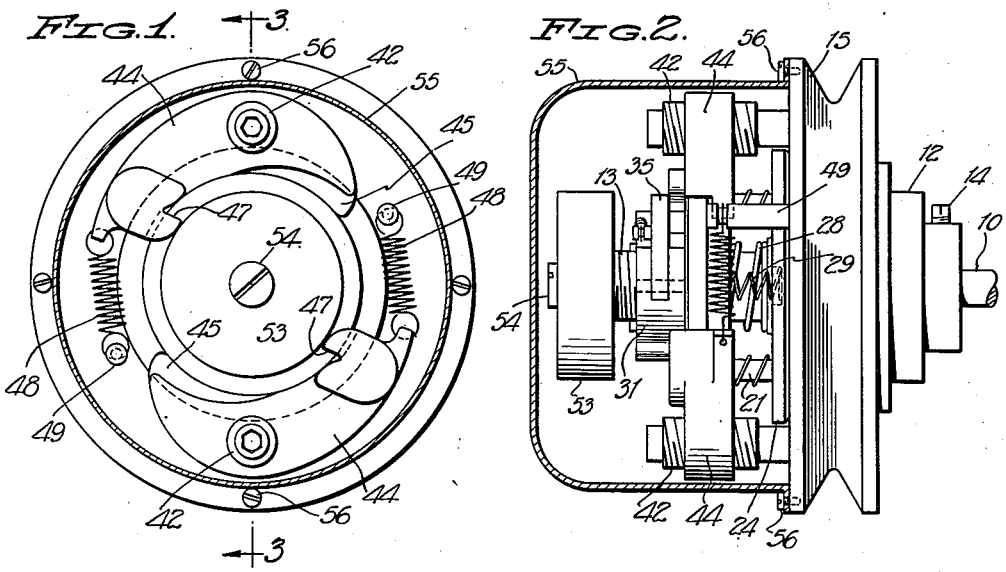
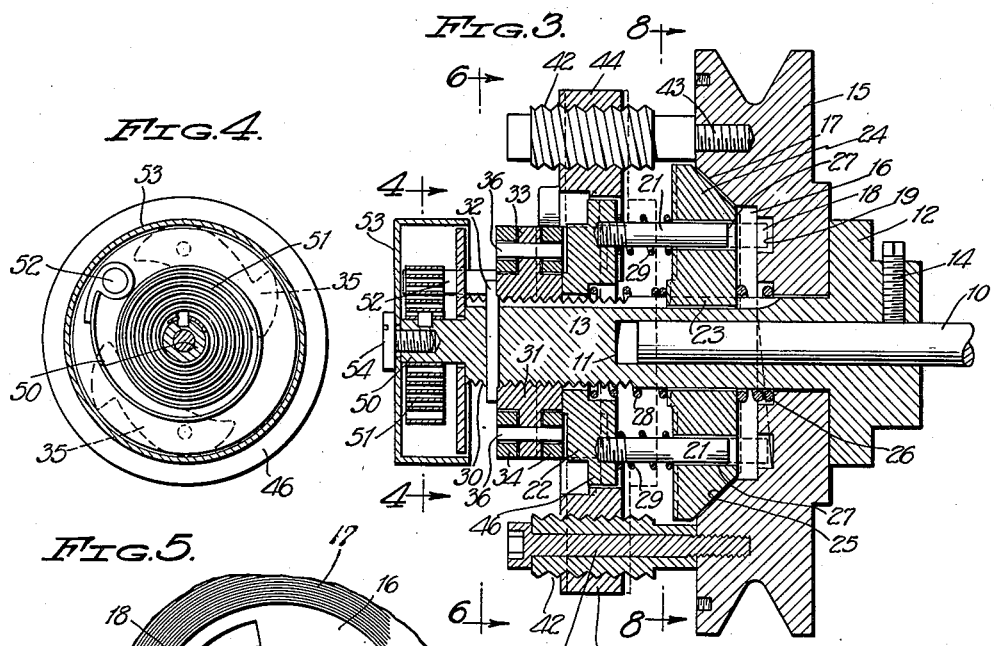
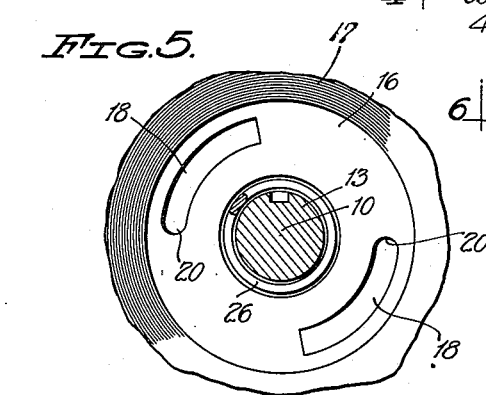
LOUIS MARGOLIS.
INVENTOR.
BY Ely & Pattison
ATTORNEYS.
WITNESS:

July 21, 1942.   L. MARGOLIS   2,290,696
AUTOMATIC FRICTION CLUTCH
Filed March 24, 1941   2 Sheets-Sheet 2

LOUIS MARGOLIS.
INVENTOR.

BY

ATTORNEYS.

WITNESS:

Patented July 21, 1942

2,290,696

UNITED STATES PATENT OFFICE 2,290,696

AUTOMATIC FRICTION CLUTCH

Louis Margolis, New York, N. Y., assignor of fifty per cent to Raymond A. Donahue, Washington, D. C.

Application March 24, 1941, Serial No. 384,852

10 Claims. (Cl. 192—53)

This invention relates to improvements in automatic friction clutches.

The primary object of the invention resides in an automatic friction clutch in which the driven element remains idle until the drive element has reached a speed of rotation sufficient to rotate the driven element and the load driven thereby. Thus the rotative drive force is relieved of the strain under which it must labor when placed in rotation from a non-rotative state. Such friction clutches are capable of wide use, such as in apparatus wherein an electric motor is employed as a source of rotative power for imparting rotation to a driven mechanism.

Another feature of the invention is to provide a friction clutch in which the drive and driven clutch elements initially frictionally engage when the initial speed of rotation of the drive element reaches a predetermined degree, and which elements subsequently lockingly engage when the driving speed of the driven clutch element reaches an operating speed of rotation.

Another feature of the invention is to provide an automatic clutch in which the drive element becomes automatically disconnected from the driven clutch element when the speed of rotation of the latter drops below a predetermined degree.

Another feature of the invention is to provide a means for positively causing the drive and driven clutch elements to interlock after the friction clutch surfaces thereof are initially brought into frictional driving contact to prevent accidental slippage between the drive and driven clutch elements during a predetermined speed of driving rotation of the driven element.

A still further feature of the invention is to provide a centrifugally controlled screw means for moving the drive clutch-element into driving engagement with the driven clutch element, and automatic spring means for returning the screw means to normal position after operative connection of the drive and driven clutch elements.

A still further feature of the invention resides in an automatic clutch which is responsive only to rotation of the drive shaft in one given direction of rotation, thereby preventing operation of the clutch should the direction of driving force accidentally become reversed.

Other novel features of the invention will become apparent as the following specification is read in conjunction with the accompanying drawings, in which:

Figure 1 is a front face elevational view of the automatic friction clutch with the housing in section.

Figure 2 is a side elevational view with the housing in section, the parts being illustrated in normal clutch disengaging position.

Figure 3 is an enlarged vertical transverse sectional view on the line 3—3 of Figure 1.

Figure 4 is a vertical transverse sectional view on the line 4—4 of Figure 3.

Figure 5 is a detail vertical transverse sectional view looking at the recessed inner side of the driven clutch element.

Figure 6:
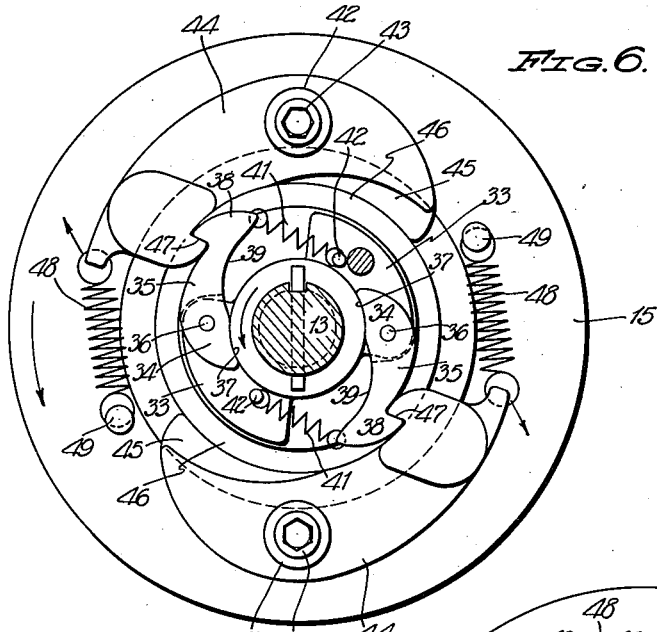
Figure 6 is a vertical transverse sectional view on the line 6—6 of Figure 3.

Referring to the drawings by reference characters, the numeral 10 designates the end of a drive shaft which may be the armature shaft of an electric motor, and which fits into an axial bore 11 extending inwardly from the hub end 12 of a spindle or drive shaft extension 13. The spindle 13 is fixedly secured to the shaft 10 by a set screw 14 threaded transversely through the hub. Freely rotatable upon the spindle 13 and fitting against the hub 12 is a driven clutch element 15 in the shape of a pulley, although it may be in the form of a gear or other driving element if so desired. The inner face side of the driven element 15 is provided with a circular recess 16, the side wall of which is provided with an annular beveled friction surface 17. The end wall of the recess is provided with a pair of opposed arcuate shaped channels 18—18, arranged in the same circumferential plane, and each of which has an inclined end wall 19 by which the channel gradually deepens from its entrance to a stop wall 20. The stop walls 20 are at those ends of the channels facing in the direction of the driving rotation of the element 15 for abutment by two opposed guide and coupling pins 21 extending inwardly from a slidable collar 22 which freely encircles the spindle 13.

Splined at 23 to the spindle for limited sliding movement thereon is a drive clutch element 24 having an annular beveled cone friction surface 25 complementary to the beveled friction surface 17 of the driven element 15 and which is normally held in spaced relation thereto by means of an expansion spring 26 which surrounds the spindle and is interposed between the end wall of the recess 16 and the inner face of the drive clutch element 24. The drive clutch element 24 is provided with openings 27 for the free passage of the guide pins 21. An expansion spring 28 surrounds the spindle 13 and is interposed between the outer side of the drive clutch element 24, and the collar 22, while four expansion springs 29, two of which encircle the pins 21, are interposed between the outer side of the drive clutch element 24 and the inner face of the collar 22, the combined tension of the springs 28 and 29 being less than the tension of the single clutch disengaging spring 26.

The end of the spindle 13 is screw threaded as at 30, and threaded thereon is an annular nut member 31 against which the outer face of the collar 22 abuts when the parts are in normal position as illustrated in full lines in Figure 3 of the drawings. A stop key 32 extends transversely through the spindle adjacent its outer end for limiting the outward turning movement of the nut member relative to the spindle 13.

Figure 7:
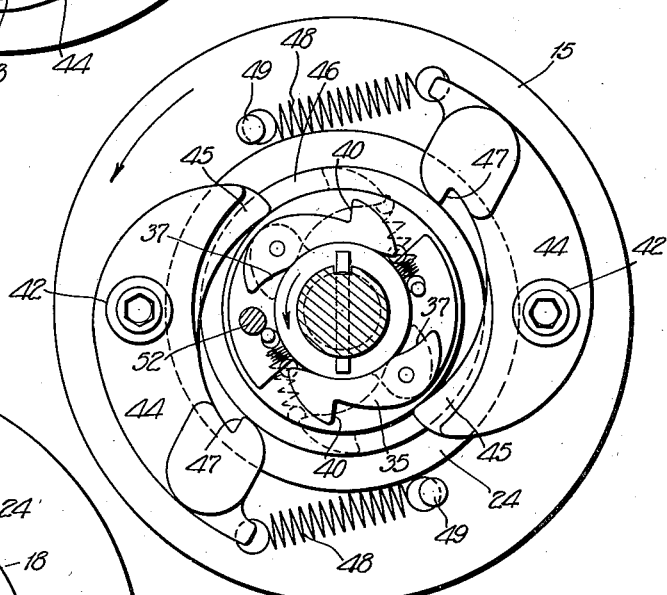
Figure 7 is a view similar to Figure 6, illustrating the stop pawls in stopping position and illustrating, the locking pawls in normal unlocking position in full lines and in locking position in dotted lines.
Figure 8:
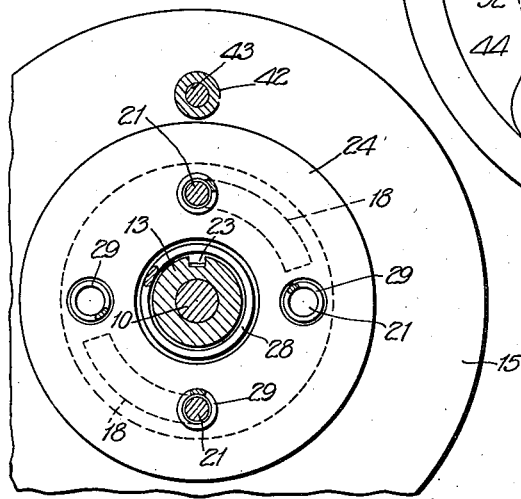
Figure 8 is a vertical transverse sectional view on the line 8—8 of Figure 3.

The nut member 31 is provided with opposed segmental ears 33—33 to which the bifurcated tail ends 34 of catch pawls 35 are pivotally connected as at 36. The inner side of the tail ends of the pawls 35 are curved as at 37 to conform to the curvature of the nut member 31 and engage the same when the locking head ends 38 thereof are expanded outwardly by centrifugal force as illustrated in Figure 6. The inner side of the head ends of the pawl are also curved as at 39 to conform to the shape of the nut member 31 and abut the same when the pawls are in normal contracted position. The outer sides of the head ends of the pawls 35 are provided with abutment shoulders 40 which face in the direction of rotation of the inward threading turning movement of the nut member 31 indicated by the arrow in Figure 6. Contractile springs 41 have one of their ends fixedly connected to the head ends 38 of the pawls 35 and their other ends fixed to pins 42 extending from the outer face of the ears 33—33 of the nut member 31. The springs 41 tend to normally swing the head ends of the pawls 35 inwardly against the annular body of the nut member 31 as best illustrated in Figure 7.

Secured to the driven element 15 and extending from the inner side thereof are a pair of diametrically opposed screw threaded posts 42, the threads of which are relatively coarse and high pitched. The posts 42 are provided with a center bore through which the shanks of headed bolts 43 pass, the inner threaded ends of the bolts being threaded into the driven element 15 while the head ends tightly abut the outer ends of the posts and secure the posts against accidental turning relative to the element 15. Threaded to the screw posts 42 are stop pawls 44—44, each of which comprises a tail having a stop flange 45 of reduced thickness and which normally abuts the periphery of an annular flange 46 provided on the collar 22. The head ends of the pawls 44 are provided with stop shoulders 47 normally disposed out of the circumferential path of the head ends 38 of the pawls 35 by contractile springs 48. One end of each spring 48 is connected to the head end of the pawl 44 while the other end is fixed to a post 49 which is fixedly carried by the driven element 15. The springs 48 yield under centrifugal force when the speed of rotation of the driven element 15 reaches a predetermined degree as will be more fully explained hereinafter.

The inward threading of the nut member 31 upon the spindle 13 is obtained by reason of the interlocking engagement of the pawls 35 and 44 upon rotation of the drive spindle 13 at a predetermined speed, and which inward threading of the nut member 31 slides the collar 32 and drive element 24 inwardly to effect initial engagement of the drive element 24 with the driven element 15. For returning the nut member 31 to its previous normal position, I employ a novel spring actuated means now to be explained. The free outer end of the spindle 13 is provided with a reduced stub extension 50 to which the inner end of a helical convolute spring 51 is secured. The convolute windings of the spring are contra to the direction of driving rotation of the spindle 13 so as to wind up during initial rotation of the spindle for placing a rewinding tension upon the spring. The outer end of the spring 51 is fixed to a post 52 which extends outwardly from the nut member 31. By reason of one end of the spring 51 being fixed to the spindle 13 and the other end being secured to the nut member 31, it will be appreciated that when the nut 31 is restrained from turning by engagement of the pawls 35 and 44, the further turning of the spindle 13 will cause the spring 51 to wind up. The spring 51 is enclosed in a housing 53 fixed to the stub extension 50 by a screw 54. A housing 55 (Figures 1 and 2) encloses the entire clutch actuating mechanism and is fastened to the inner side of the driven element 15 by fastening screws 56.

In practice, assume that the drive shaft 10 is stationary and the parts are in normal position as illustrated in full lines in Figures 1 to 4 inclusive, whereupon the clutch elements 24 and 15 are disengaged. Also assume that a load to be driven is connected to the driven element 15 and that rotative driving power is applied to the drive shaft 10. The spindle 13 being fixed to the drive shaft 10 and the drive element 24 being slidably splined to the spindle rotate with the drive shaft but no driving power is yet imparted to the driven element 15 due to its disengagement with the drive clutch element 24. Thus it is apparent that some means must be placed in operation to slide the drive clutch element 24 into operative driving engagement with the clutch element 15. Such actuating means includes the nut member 31 which is threaded inwardly on the spindle 13 after the rotation of the spindle 13 reaches a predetermined speed. As the spindle 13 starts its rotation, the pawls 44 are stationary by the load on the driven element 15, thus the nut member rotates in the same direction as the spindle. However, at a predetermined speed of rotation of the spindle and nut member 31, the head ends of the pawls 35 carried by the nut member 31 swing outwardly by centrifugal force and engage the pawls 44, thus holding back the nut member from rotating at the same rate of speed as the spindle 13, whereby the nut member 31 threads inwardly on the spindle 13 to effect initial frictional clutching engagement of the elements 24 and 15. More specifically, as the nut member 31 rotates at a predetermined speed with the spindle, centrifugal force causes the head ends 38 of the pawls 35 to swing outward into the path of the stop shoulders 47 of the pawls 44 to prevent turning of the nut member with the spindle as illustrated in full lines in Figure 6 and in dotted lines in Figure 3. The inward threading of the nut member 31 relative to the spindle 13 causes the collar 22 to slide inwardly, which collar through the springs 28 and 29 pushes the drive clutch element 24 into initial friction clutching engagement with the driven clutch element 15, and at which time the friction surfaces 25 and 27 are contacting but the free ends of the guide pins 21 have not as yet entered the arcuate recesses 18. However, when the speed of the driven element 15 reaches a higher predetermined speed, the collar is moved inward to its limit of inward sliding movement as shown in dotted lines in Figure 3, at which time the pins 21 enter the recesses and engage behind the shoulder walls 20. The collar 22 has sliding movement relative to the sliding movement of the drive clutch element 24 and has a greater range of sliding movement as will be seen in Figure 3 in order to cause the guide pins to enter the recesses 18. It will be understood that the final locking of the drive and driven elements takes place when the driven element has obtained its predetermined speed of rotation, which is effected when the two pawls 44—44 swing outward under centrifugal force, which in turn, moves the sliding collar 22 inwardly to its limit of operative movement to cause the guide pins 21 to enter the respective recesses 18 to engage with closed end walls 20 thereof, thus causing a positive locking of the drive element with the driven element. The drive and driven clutch elements 24 and 15 are now engaged and as the speed of rotation of the driven clutch element 15 increases, centrifugal force causes the head ends of the pawls 44 to swing outward and the tail ends to swing inward as illustrated in Figure 7, thus causing disengagement of the same with the pawls 35, at which time the tension of the wound spring 51 imparts a return outward turning movement of the nut member 31 relative to the spindle 13. As the pawls 44 swing under centrifugal force, they move inwardly due to their threading engagement with the threaded posts and the stop flanges 45 thereof move to a position outward behind the flange 46 of the collar to prevent the springs 28 and 29 from returning the collar to its normal position. The return movement of the nut member 31 is so timed with respect to the action of the pawls 44, that the flanges 45 thereof have assumed their locking position behind the flange 46 before the nut member starts its return outward movement. So long as the speed of rotation of the driven element 15 remains above a predetermined degree, the centrifugal force will hold the stop pawls 44 in the path of the flange 46 and prevent return movement of the collar 22, whereupon the clutch elements 15 and 24 remain in clutching engagement. Should the speed of the driven element 15 drop below the predetermined amount, the springs 48 pull the head ends of the pawls 44 inwardly to cause the tail flanges 45 to move out of the path of the flange 46 of the collar 22, whereupon the springs 28 and 29 slide the collar 22 outwardly to a position against the nut member 31, causing the guide pins 21 to move out of the arcuate recesses 18, and the spring 26 slides the drive clutch element 24 away from and out of frictional engagement with the driven clutch element 15.

While I have shown and described what I consider to be the preferred embodiment of my invention, I wish it to be understood that such changes in construction and design as come within the scope of the appended claims may be resorted to if desired without departing from the spirit of the invention.

Having thus described the invention, what I claim as new and desire to secure by Letters Patent of the United States, is:

1. A clutch mechanism comprising in combination, a drive shaft, a drive clutch element slidably keyed to said drive shaft, a driven clutch element freely mounted on said shaft in confronting relation to the drive clutch element, spring means acting to disengage the drive clutch element from the driven clutch element, a nut member threaded on said shaft for movement inwardly toward and outwardly away from the drive clutch element, slidable means engageable by the inward movement of the nut member for sliding the drive clutch element into clutching engagement with the driven clutch element, centrifugally controlled means operable upon an initial predetermined speed of rotation of the drive shaft for threading said nut member inwardly on said shaft to cause the slidable means to slide said drive clutch element into initial clutching engagement with said driven clutch element, centrifugally controlled means responsive to a predetermined speed of rotation of the driven element for rendering the first mentioned centrifugally controlled means ineffective and for holding the slide means in clutch actuating position, and spring actuated means rendered operable upon the inward threading movement of the nut member for threading the nut member outwardly on said shaft for return to normal position upon actuation of the second mentioned centrifugally controlled means.

2. A clutch mechanism comprising in combination, a drive shaft, a drive element slidably keyed to said shaft, a driven clutch element freely mounted on said shaft in confronting relation to said drive clutch element, spring means acting to disengage said drive clutch element from clutching engagement with the driven clutch element, a collar slidably mounted on said shaft, spring means intermediate said collar and said drive clutch element, a nut member threaded to said shaft, a windable helical spring, connecting the nut member and shaft centrifugally actuated means for preventing rotation of the nut member with the rotating shaft to cause the nut member to thread toward the collar to slide the drive clutch element into clutching engagement with the driven clutch element and simultaneously wind the helical spring to increase the tension thereof, and centrifugally actuated means responsive to a predetermined speed of rotation of the driven element for rendering the first mentioned centrifugally actuated means ineffective to permit the wound helical spring to thread the nut member outwardly away from the collar and for simultaneously holding the collar against the actuation of the spring means acting upon it to maintain the drive clutch element in clutching engagement with the driven clutch element.

3. A clutch mechanism as set forth in claim 2, including socket recesses provided in the driven clutch element, and coupling pins carried by the collar and slidable through the drive clutch element for reception in said socket recesses when the collar is slid to effect an initial engagement of the drive clutch element with the driven clutch element.

4. A clutch mechanism comprising in combination, a drive element, a driven element coaxial with the drive element, complementary confronting friction clutch surfaces on the drive element and driven element, spring means acting to disengage the drive element and driven element, centrifugally controlled means operable upon initial turning movement of the drive element for effecting an initial driving connection between the drive element and driven element through the engagement of the friction clutch surfaces, normally ineffective interlocking elements between the drive element and the driven element, and centrifugally controlled means responsive to a predetermined initial speed of rotation of the driven element for rendering the first mentioned centrifugally controlled means ineffective and for effecting operation of the interlocking elements for positively connecting the drive and driven clutch elements.

5. A clutch mechanism comprising in combination, a slidable drive element having an annular friction surface, a driven element coaxial with the drive element and having an annular friction surface in confronting relation to the friction surface of the drive element, spring means acting to disengage the slidable drive element from the driven element, means for sliding the drive clutch element axially into frictional clutching engagement with the driven clutch element, centrifugally actuated means operable upon a predetermined speed of rotation of the drive element for operating said means for initially effecting frictional clutching engagement of the friction surface of the drive element with the friction surface of the driven element, and centrifugally actuated means responsive to a predetermined speed of rotation of the driven element for rendering the first mentioned centrifugally actuated means ineffective, and means simultaneously operated by the actuation of the second centrifugally actuated means for maintaining the drive element and driven element in locked clutch driving engagement against the action of said spring means.

6. A clutch mechanism comprising in combination, a slidable drive clutch element having an annular friction surface, a driven clutch element coaxial with the drive clutch element and having an annular friction surface in confronting relation to the friction surface of the drive clutch element, spring means acting to disengage the drive clutch element from the driven clutch element, screw actuated means for sliding the drive clutch element into engagement with the driven clutch element to effect an initial frictional clutching engagement between the friction surfaces thereof, centrifugally responsive means for causing the screw actuated means to function upon predetermined speed of rotation of the drive clutch element, and centrifugally responsive means operable upon rotation of the driven clutch element at a predetermined speed to render the screw actuated means ineffective, and interlocking means simultaneously operated by the last mentioned centrifugally responsive means for maintaining the drive clutch element in positive driving engagement with the driven clutch element against the action of said spring means.

7. In a clutch mechanism, a drive shaft, a spindle fixed to and extending from one end of said drive shaft, an annular driven clutch element freely rotatable on the inner end of said spindle, said driven clutch element having an annular recess provided in the outer side thereof, the annular side wall of the recess having an annular beveled friction surface provided thereon, an annular drive clutch element slidably keyed to said spindle and having an annuular beveled friction surface on the inner face thereof in confronting relation to the friction surface on said driven element, an expansion spring surrounding said spindle and interposed between the driven and drive elements to urge the drive element away from the driven element, external screw threads provided on the outer portion of the spindle, a nut member having threading engagement with the threaded portion of said spindle, a collar freely surrounding said spindle and interposed between said nut member and said drive clutch element, spring means interposed between said drive clutch element and said collar, the force of said spring means being less than that of said spring, centrifugally actuated means operable upon a predetermined speed of rotation of the spindle and nut member for holding said nut member against rotation with said spindle to cause the threaded portion of the spindle to move the nut member inwardly against said collar and in turn, cause said collar through the spring means to slide the drive clutch element into engagement with the driven clutch element to effect frictional clutching engagement of the beveled friction surfaces thereof, and windable spring means connected to said spindle and to said nut member which is windable to an increased tension upon inward movement of the nut member for placing a rewinding tension upon the nut member for turning the nut outwardly of the spindle to a return position when the centrifugally actuated means becomes ineffective.

8. In a clutch mechanism, a drive shaft, a spindle fixed to and extending from one end of said drive shaft, an annular driven clutch element freely rotatable on the inner end of said spindle, said driven clutch element having an annular recess provided in the outer side thereof, the annular side wall of the recess having an annular beveled friction surface provided thereon, an annular drive clutch element slidably keyed to said spindle and having an annular beveled friction surface on the inner face thereof in confronting relation to the friction surface on said driven element, an expansion spring surrounding said spindle and interposed between the driven and drive elements to urge the drive element away from the driven element, external screw threads provided on the outer portion of the spindle, a nut member having threading engagement with the threaded portion of said spindle, a collar freely surrounding said spindle and interposed between said nut member and said drive clutch element, spring means interposed between said drive clutch element and said collar, the force of said spring means being less than that of said spring, centrifugally actuated means operable upon a predetermined speed of rotation of the spindle and nut member for holding said nut member against rotation with said spindle to cause the threaded portion of the spindle to move the nut member inwardly against said collar and in turn cause said collar through the spring means to slide the drive clutch element into engagement with the driven clutch element to effect frictional clutching engagement of the beveled friction surfaces thereof, coupling pins fixedly carried by the collar and freely slidable through openings in said drive clutch element, ratchet-like recesses provided in the end wall of the recess in the driven clutch element and engageable by the inner free ends of the coupling pins upon subsequent inward movement of the nut member against the tension of the spring means to effect a positive driving coupling between said drive clutch element and said driven clutch element, windable spring means connected to said spindle and to said nut member which is windable to an increased tension upon inward movement of said nut member for placing a rewinding tension upon said nut member, and centrifugally actuated means carried by said driven element and operable upon a predetermined speed of rotation of the driven clutch element for rendering the first named centrifugally actuated means ineffective and for holding said collar in its inward advanced position against the tension of said spring means, whereby said nut member is free to turn relative to the spindle and move outwardly of the same under the unwinding action of the windable spring means.

9. In a clutch mechanism, a drive spindle having an externally screw threaded portion at one end and a stop flange inwardly thereof and spaced from the inner end of the threaded portion, an annular driven clutch element freely rotatable on said spindle and disposed against said stop flange, an annular drive clutch element slidably keyed to said spindle between the threaded portion and the driven clutch element, said driven and drive clutch elements having confronting beveled friction surfaces, a spring surrounding said spindle and interposed between said driven and drive clutch elements for urging the drive clutch element away from the driven clutch element, a nut member threaded to the threaded portion of said spindle for turning movement therewith upon initial turning movement of said spindle, a collar freely surrounding said spindle and interposed between said nut member and said drive clutch element, spring means between said collar and said drive clutch element, the tension of said spring means being less than the tension of the spring between the drive and driven clutch elements, centrifugally actuated locking pawls pivoted to said nut member, each of said locking pawls having a hooked end, springs acting to hold the hooked ends of the pawls inwardly, threaded posts extending from the outer side of said driven clutch element, centrifugally actuated stop pawls threaded to the threaded posts, each of said stop pawls having a hook at one end, springs tending to urge the hooked ends of the stop pawls inwardly, the hooked ends of said locking pawls and stop pawls being in the same lateral plane but normally out of the same circumferential plane, a helical spring having its inner end connected to said spindle and its outer end connected to said nut member, whereby initial rotation of the spindle at a predetermined speed will cause the hooked ends of the locking pawls to swing outward under centrifugal force into the circumferential plane of the hooked ends of the stop pawls and engage the same to hold said nut member against turning to cause said nut member to be threaded inwardly against the collar which in turn slides the drive clutch element by the medium of the spring means therebetween into frictional clutching engagement with the driven clutch element and which simultaneously imparts a winding of the helical spring, said stop pawls being actuated by centrifugal force upon rotation of the driven clutch element at a predetermined speed to swing the hooked ends of the same out of the circumferential plane of the hooked ends of the locking pawls to enable the wound helical spring to turn said nut member outwardly relative to said spindle for return to its normal position, and means on the stop pawls movable into the path of outward movement of the collar when under the action of centrifugal force to prevent the outward sliding movement of the collar against the action of the spring means between the collar and the drive clutch element.

10. In a clutch mechanism as set forth in claim 9, including coupling pins carried by the collar and freely extending through openings in the drive clutch element, and pin receiving recesses provided in the outer side of the driven clutch element for receiving the free inner ends of the coupling pins to lock the drive and driven clutch elements together.

LOUIS MARGOLIS.